(12) United States Patent
Du et al.

(10) Patent No.: US 10,822,907 B2
(45) Date of Patent: *Nov. 3, 2020

(54) WELLBORE SEAL ENERGIZING RING WITH RETAINING FEATURE

(71) Applicant: Vetco Gray, LLC, Houston, TX (US)

(72) Inventors: Robert Jen-Yue Du, Houston, TX (US); Dinesh Narayan, Bangalore (IN); Durai Balaji, Bangalore (IN); David Lawrence Ford, Houston, TX (US); Baozhi Zhu, Houston, TX (US); Krishnanand Anandan, Houston, TX (US); Kendra Limbrick, Houston, TX (US)

(73) Assignee: VETCO GRAY INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,569

(22) Filed: Mar. 18, 2019

(65) Prior Publication Data

US 2019/0234169 A1 Aug. 1, 2019

Related U.S. Application Data

(63) Continuation of application No. 14/930,140, filed on Nov. 2, 2015, now Pat. No. 10,233,711.

(51) Int. Cl.
*E21B 33/04* (2006.01)
*F16J 15/08* (2006.01)

(52) U.S. Cl.
CPC .............. *E21B 33/04* (2013.01); *F16J 15/08* (2013.01); *E21B 2200/01* (2020.05)

(58) Field of Classification Search
CPC ....................................................... E21B 33/04
(Continued)

(56) References Cited

U.S. PATENT DOCUMENTS

| 5,174,376 A | 12/1992 | Singeetham |
| 5,456,314 A | 10/1995 | Boehm, Jr. |

(Continued)

FOREIGN PATENT DOCUMENTS

GB 2224526 9/1989

OTHER PUBLICATIONS

Milberger et al, "High Performance Metal-Seal System for Subsea Wellhead Equipment," Offshore Technology Conference, 1989, pp. 411-422.

(Continued)

*Primary Examiner* — Taras P Bemko
(74) *Attorney, Agent, or Firm* — Hogan Lovells US LLP

(57) ABSTRACT

A wellhead assembly includes an outer wellhead member having a bore and an inner wellhead member located in the bore, defining an annular pocket between the outer and inner wellhead members. A sealing assembly is located within the annular pocket, the sealing assembly having an annular seal and an energizing ring. The energizing ring engages inner and outer legs of the annular seal to push the inner and outer legs into sealing engagement with the inner and outer wellhead members. A retainer nut is threadingly attached to the free end of the outer leg of the sealing assembly. Mating grooves are located on one of an inner diameter of the retainer nut and an outer diameter of the energizing ring and mating protrusions located on the other. The mating protrusions mate with the mating grooves to prevent relative axial movement between the energizing ring and the annular seal.

19 Claims, 3 Drawing Sheets

(58) Field of Classification Search
USPC .......................................................... 166/379
See application file for complete search history.

(56) References Cited

U.S. PATENT DOCUMENTS

| | | |
|---|---|---|
| 8,312,922 B2 | 11/2012 | Nelson |
| 8,500,127 B2 | 8/2013 | Gette |
| 8,607,861 B2 | 12/2013 | Saylor, III |
| 8,707,186 B2 | 4/2014 | Galle |
| 2012/0247788 A1 | 10/2012 | Ford |
| 2014/0096977 A1 | 4/2014 | Gette |
| 2014/0238699 A1 | 8/2014 | Gette |

OTHER PUBLICATIONS

Blizzard, "Metallic Sealing Technology in Downhole Completion Equipment," Journal of Petroleum Technology, Oct. 1990, pp. 1244-1247.

George E. King Engineering, "Wellheads and Trees," Mar. 14, 2009, 61 pages.

WELLBORE SEAL ENERGIZING RING WITH RETAINING FEATURE

CROSS REFERENCE TO RELATED APPLICATIONS

This application is a continuation of U.S. patent application Ser. No. 14/930,140, filed Nov. 2, 2015, now U.S. Pat. No. 10,233,711, issued Mar. 19, 2019, the full disclosure of which is hereby incorporated by reference herein for all purposes.

BACKGROUND OF THE DISCLOSURE

1. Field of the Disclosure

The present disclosure relates in general to systems and methods for sealing between two wellbore members. More specifically, the disclosure relates to an energizing ring that provides a retaining feature to prevent the energizing ring from backing out of an annular seal.

2. Description of the Related Art

In an oil or gas well, the wellhead is generally a tubular member having an axial bore through which other wellbore members may extend. For instance, a casing hanger often extends through the wellhead to support a casing string that extends below the wellhead into the well. The casing hanger can be supported on a load shoulder within the axial bore such that an annular pocket is defined between the casing hanger and the wellhead. An annular sealing assembly may be provided within the annular pocket. The annular sealing assembly can seal the annular pocket to contain internal well pressure and prevent well fluids from escaping out of the well. During wellbore operations, the wellhead can be subjected to high pressure. This pressure can exert upward force on the casing hanger. Significant force can urge the casing hanger upward from its position in the wellhead housing. The annular sealing assembly can also act as a lockdown device to help resist movement of the hanger relative to the wellhead that is caused by, for example, the annulus pressure or thermal growth.

One type of annular sealing assembly has a seal body for creating a metal-to-metal seal with a generally "U" shaped cross-section defined by inner and outer legs. The inner and outer legs are radially separated from one another at one end and coupled to one another at their opposite ends. In alternate embodiments, the seal body can be generally "H" shaped or generally upside down "U" shaped. An energizing ring is pressed into an annular clearance between the inner and outer legs to force the legs apart, and thereby force the legs into sealing engagement with adjacent wellbore members, such as the wellhead and casing hanger. The energizing ring can be a solid wedge-shaped member with tapered surfaces. However, the shape of the tapered surfaces on the energizing ring means that any upward movement of the energizing ring can allow the inner and outer legs ring to move towards each other, weakening the lockdown and compromising the seal.

SUMMARY OF THE DISCLOSURE

In some current seal designs, after setting, there will not be any contact between the energizing ring and the retainer nut, that is used to retain the energizing ring with the seal body during installation of the sealing assembly. The wedge shape in the energizing ring and higher temperature environment can cause the energizing ring to move up axially relative to the retainer nut, which results in loss of sealing effectiveness and lockdown capabilities of the sealing assembly.

Systems and methods described herein provide a retaining feature that helps to maintain the position of the energizing ring in a fully set and energized position within the annular seal. Mating protrusions on an outer diameter of the energizing ring can engage and mate with mating grooves on an inner diameter of the retainer nut, which is secured to the outer leg of the annular seal. The engagement of the mating protrusions with the mating grooves can prevent relative axial movement between the energizing ring and the annular seal during operating conditions.

In an embodiment of this disclosure, a wellhead assembly with an axis includes an outer wellhead member having a bore. An inner wellhead member is located in the bore, defining an annular pocket between an inner diameter of the outer wellhead member and an outer diameter of the inner wellhead member. A sealing assembly is located within the annular pocket, the sealing assembly having an annular seal and an energizing ring. The annular seal has inner and outer legs separated by a slot so that a free end of each of the legs is spaced apart and an opposite joined end of each of the legs is connected together. The energizing ring is generally cylindrical in shape with surfaces that slidingly engage the inner and outer legs of the annular seal to push the inner and outer legs into sealing engagement with the inner and outer wellhead members. A retainer nut is threadingly attached to the free end of the outer leg of the sealing assembly. Mating grooves are located on one of an inner diameter of the retainer nut and an outer diameter of the energizing ring and mating protrusions located on the other of the inner diameter of the retainer nut and the outer diameter of the energizing ring. The mating protrusions are shaped to engage and mate with the mating grooves when the energizing ring is in an energized position, preventing relative axial movement between the energizing ring and the annular seal.

In an alternate embodiment of this disclosure, a wellhead system includes an annular wellhead housing defining an axis and including an axial bore. A housing sealing surface is defined on the annular wellhead housing within the axial bore. An annular casing hanger is mounted in the axial bore, defining an annular pocket between an inner diameter of the wellhead housing and an outer diameter of the casing hanger. The casing hanger has a hanger sealing surface defined on the annular casing hanger. A sealing assembly is located within the annular pocket, the sealing assembly has an annular seal having an inner leg and an outer leg, the inner and outer legs are separated by a slot so that a free end of each of the legs is spaced apart and a joined end of each of the legs is connected together. An energizing ring has surfaces that slidingly engage the inner and outer legs of the annular seal, selectively moving the annular seal to an energized position by pushing the inner leg into sealing engagement with the hanger sealing surface and the outer leg into sealing engagement with the housing sealing surface. A retainer nut is threadingly attached to the free end of the outer leg of the sealing assembly. The retainer nut retains the energizing ring with the annular seal during insertion of the sealing assembly into the annular pocket. Mating grooves are formed on an inner diameter of the retainer nut. Mating protrusions are located on an outer diameter of the energizing ring, the mating protrusions shaped to engage and mate with the mating grooves when the energizing ring is in the energized position, preventing relative axial movement between the energizing ring and the annular seal.

In yet another alternate embodiment of this disclosure, a method for forming a wellhead assembly includes providing an outer wellhead member having a bore. An inner wellhead member is located in the bore, defining an annular pocket between an inner diameter of the outer wellhead member and an outer diameter of the inner wellhead member. A sealing assembly is located within the annular pocket, the sealing assembly having an annular seal and an energizing ring. The annular seal has inner and outer legs separated by a slot so that a free end of the legs are spaced apart and an opposite joined end of the legs are connected together. The sealing assembly also has a retainer nut threadingly attached to the free end of the outer leg of the sealing assembly. The annular seal is energized by slidingly engaging the inner and outer legs of the annular seal with surfaces of the energizing ring, pushing the inner and outer legs into sealing engagement with the inner and outer wellhead members. Mating protrusions located on one of an inner diameter of the retainer nut and an outer diameter of the energizing ring are engaged with mating grooves located on the other of the inner diameter of the retainer nut and the outer diameter of the energizing ring to mate the mating protrusions with the mating grooves and prevent relative axial movement between the energizing ring and the annular seal.

BRIEF DESCRIPTION OF THE DRAWINGS

So that the manner in which the above-recited features, aspects and advantages of the systems and methods disclosed herein, as well as others that will become apparent, are attained and can be understood in detail, a more particular description of the disclosure briefly summarized above may be had by reference to the embodiments thereof that are illustrated in the drawings that form a part of this specification. It is to be noted, however, that the appended drawings illustrate only example embodiments of the disclosure and are, therefore, not to be considered limiting of the scope, for the disclosure may admit to other equally effective embodiments.

DETAILED DESCRIPTION

The present disclosure will now be described more fully hereinafter with reference to the accompanying drawings which illustrate embodiments of the disclosure. Systems and methods of this disclosure may, however, be embodied in many different forms and should not be construed as limited to the illustrated embodiments set forth herein. Rather, these embodiments are provided so that this disclosure will be thorough and complete, and will fully convey the scope of the disclosure to those skilled in the art. Like numbers refer to like elements throughout, and the prime notation, if used, indicates similar elements in alternative embodiments.

Figure 1:
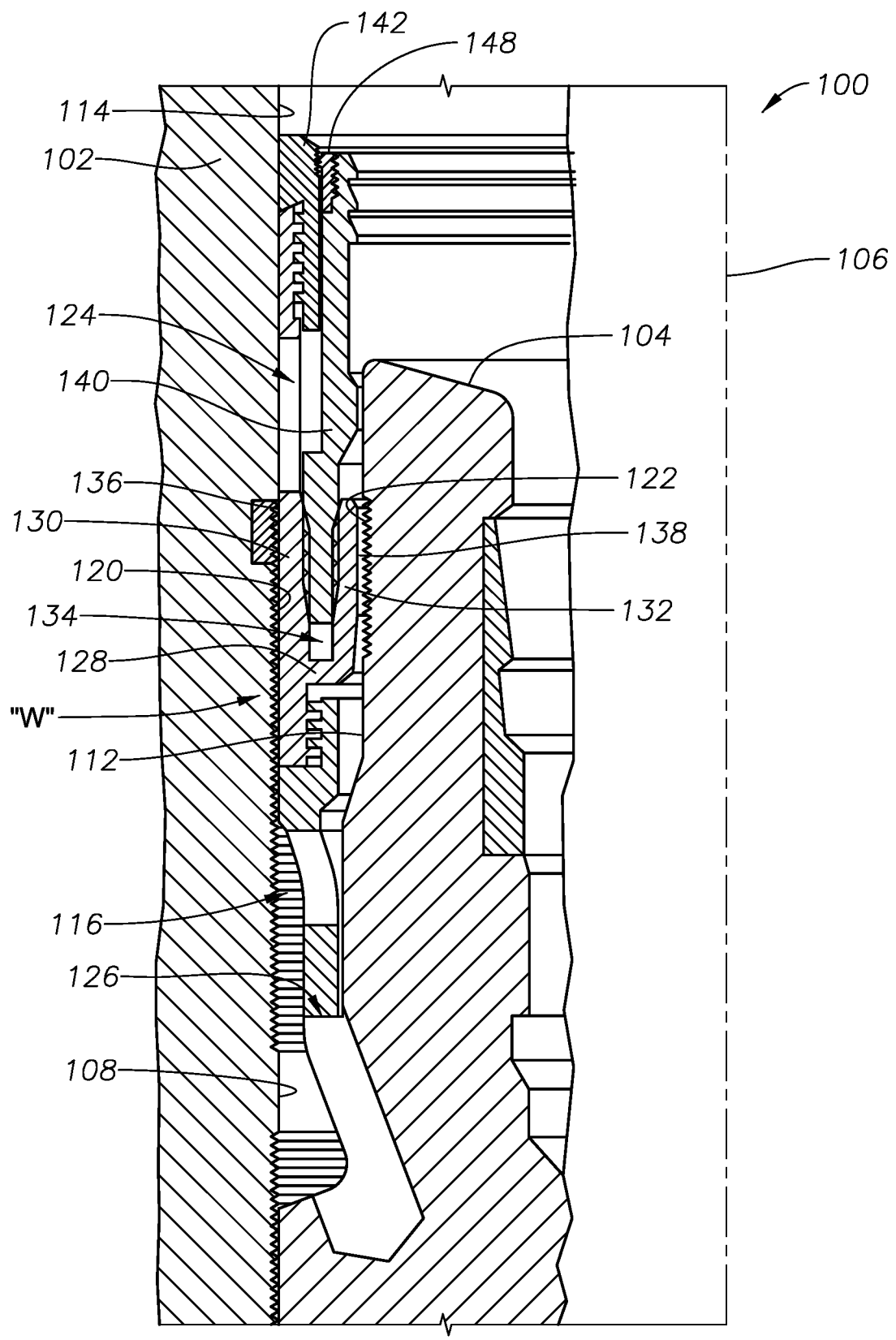
FIG. 1 is an elevational section view of a wellbore system including an annular sealing assembly with an energizing ring having a retaining feature in accordance with an embodiment of this disclosure, shown with the annular seal in an energized position.

Referring to FIG. 1, wellhead assembly 100 includes outer wellhead member 102 and inner wellhead member 104. Outer wellhead member 102 can be, for example, a wellhead housing and inner wellhead member 104 can be, as an example, a casing hanger. As one of skill in the art will appreciate, other wellhead members such as tubing hangers, fluid conduits or other generally tubular members used in both offshore and land based hydrocarbon drilling and production operations may be provided as the outer and inner wellhead members. In the illustrated embodiment, outer wellhead member 102 is a conventional high-pressure housing operable in a subsea well. Outer wellhead member 102 is a generally tubular shaped member circumscribing inner wellhead member 104, and can be disposed at an upper end of a subsea well. As used herein, spatially relative terms such as "upper" and "lower" are used for ease of description to describe one element's relationship to another as illustrated in the figures, and are intended to encompass alternate orientations of the illustrated systems and devices.

Outer wellhead member 102 has a longitudinal axis 106 and includes axial bore 108 extending through wellhead housing along longitudinal axis 106. Inner wellhead member 104 is a tubular member at least partially located within axial bore 108. An upper end of a casing string (not shown) that extends into the subsea well can be coupled to a lower end of inner wellhead member 104. Inner wellhead member 104 has an outer diameter 112 that is spaced radially inward from an inner diameter 114 of outer wellhead member 102. A clearance or annular pocket 116 is defined between outer diameter 112 of inner wellhead member 104 and inner diameter 114 of outer wellhead member 102.

A first sealing surface such as housing sealing surface 120 is located on inner diameter 114 of outer wellhead member 102. As used herein, numerical terms such as "first" and "second" are used for ease of description and are not necessarily intended to imply a sequence or order unless clearly indicated by the context. Thus, a "first" element discussed below could be termed a "second" element without departing from the teachings of the example embodiments described herein. A second sealing surface such as hanger sealing surface 122 is located on outer diameter 112 of inner wellhead member 104, radially across annular pocket 116 from housing sealing surface 120 when inner wellhead member 104 is landed within outer wellhead member 102.

In the example embodiment of FIG. 1, housing sealing surface 120 includes wickers "W". The wickers "W" on housing sealing surface 120 are generally a series of alternating, triangularly-shaped ridges and grooves arranged in parallel relation to one another. Wickers "W" can be constructed from a harder material than a radially adjacent seal surface such that the wickers "W" are operable to deform and embed into the radially adjacent seal surface (such as outer sealing surface 136 discussed below). The wickers "W" can be used without substantial deformation or damage to wickers "W", and thus be subsequently re-used to form a sealing engagement with other sealing surfaces.

Hanger sealing surface 122 can have any of a variety of surfaces textures such as threads, wickers, or another textured surface that enhances friction while maintaining a seal. In alternate embodiments, hanger sealing surface 122 can have a generally smooth surface.

Sealing assembly 124 is disposed in annular pocket 116 between outer diameter 112 and inner diameter 114. Sealing assembly 124 is supported on upward facing shoulder 126 of inner wellhead member 104. In alternate embodiments, sealing assembly 124 could be axially supported by the outer wellhead member 102. Sealing assembly 124 can be formed entirely of metal components or a combination of metal and non-metal components. The components of sealing assembly 124 include annular seal 128. In the example shown, annular seal 128 is generally "U" shaped in cross section having an outer leg 130 and a parallel inner leg 132.

Outer leg 130 and inner leg 132 are separated and spaced apart from one another at free ends of inner and outer legs 130, 132, and are connected to one another near opposite joined ends of inner and outer legs 130, 132. The radial separation of inner and outer legs 130, 132 defines an annular slot 134 between inner and outer legs 130, 132. Within slot 134, inner and outer legs 130, 132 can have smooth surfaces that are generally parallel with one other. An outer diameter surface of outer leg 130 includes outer sealing surface 136 for engaging housing sealing surface 120, and an inner diameter surface of inner leg 132 includes inner sealing surface 138 for engaging hanger sealing surface 122. In some embodiments, the outer leg 130 is constructed of a relatively soft material with respect to the wickers "W" on sealing housing sealing surface 120, such that the wickers "W" on housing sealing surface 120 can bite into the outer sealing surface 136. In some embodiments, the outer leg 130 is constructed of low-carbon steel.

Sealing assembly 124 further includes energizing ring 140. Energizing ring 140 is generally cylindrical in shape and axially movable with respect to annular seal 128 such that energizing ring can be lowered into slot 134, moving annular seal 128 to an energized position. The radial thickness of energizing ring 140 is greater than an initial radial dimension of slot 134 such that movement of energizing ring into slot 134 causes surfaces of energizing ring of 140 to slidingly engage inner and outer legs 130, 132 and to push outer leg 130 and inner leg 132 radially apart from one another and into sealing engagement with housing sealing surface 120 and hanger sealing surface 122, respectively. The radial force applied to the legs 130, 132 by movement of the energizing ring 140 into the slot 134 can vary axially along the legs. For instance, in some embodiments, the radial force applied to the free ends of the legs 130, 132 can be greater than the radial force applied adjacent to connected ends of the legs 130, 132. The wickers "W" defined on housing sealing surface 120 bite into outer sealing surface 136, thereby axially restraining annular seal 128 with respect to outer wellhead member 102, in addition to forming the sealing engagement.

Retainer nut 142 of sealing assembly 124 can be threadingly attached to the free end of outer leg 130 of annular seal 128 of sealing assembly 124. Retainer nut 142 has a downward facing shoulder that can engage an upward facing shoulder of energizing ring 140 so that energizing ring 140 cannot be separated from annular seal 128 and so that energizing ring 140 is retained with annular seal 128 as sealing assembly 124 is inserted into and set within annular pocket 116.

Figure 2:
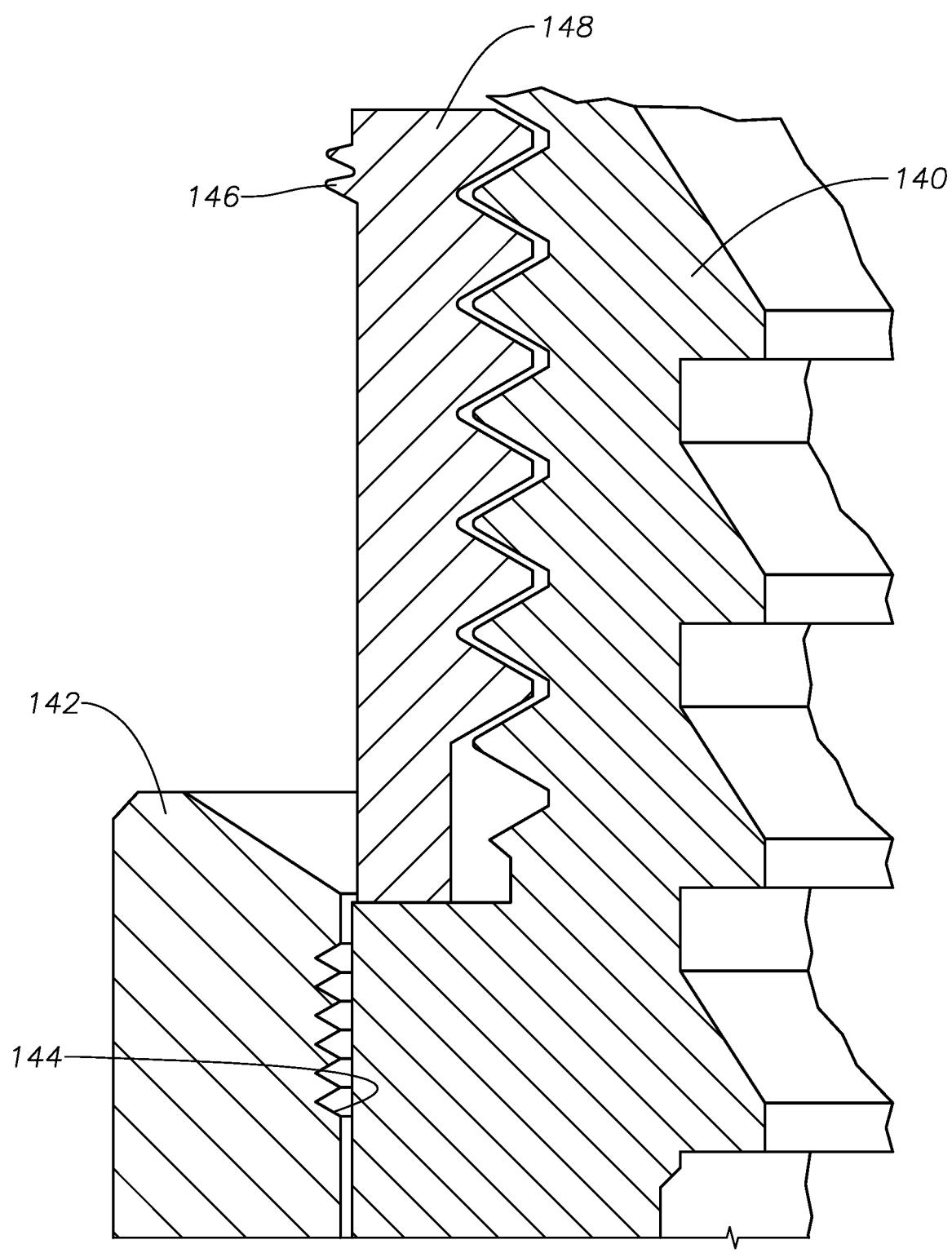
FIG. 2 is an enlarged view of a portion of an annular sealing assembly with an energizing ring having the retaining feature of FIG. 1, shown with the retaining feature unengaged.

Looking at FIG. 2, retainer nut 142 has mating grooves 144 on an inner diameter of retainer nut 142. Mating grooves 144 can circumscribe the entire 360 degree radius of retainer nut 142. Mating grooves 144 are sized and positioned to engage and mate with mating protrusions 146. Mating protrusions 146 are located on an outer diameter of energizing ring 140. When energizing ring 140 is in a energized position (FIGS. 3-4), mating protrusions 146 are shaped to engage and mate with mating grooves 144 to prevent relative axial movement between energizing ring 140 and annular seal 128. By preventing relative axial movement between energizing ring 140 and annular seal 128, a maximum lockdown capacity of annular seal 128, as well as the seal integrity of annular seal 128 can be maintained, even if the wellhead assembly 100 is subjected to high pressure or temperatures that exert an upward force on inner wellhead member 104.

Figure 3:
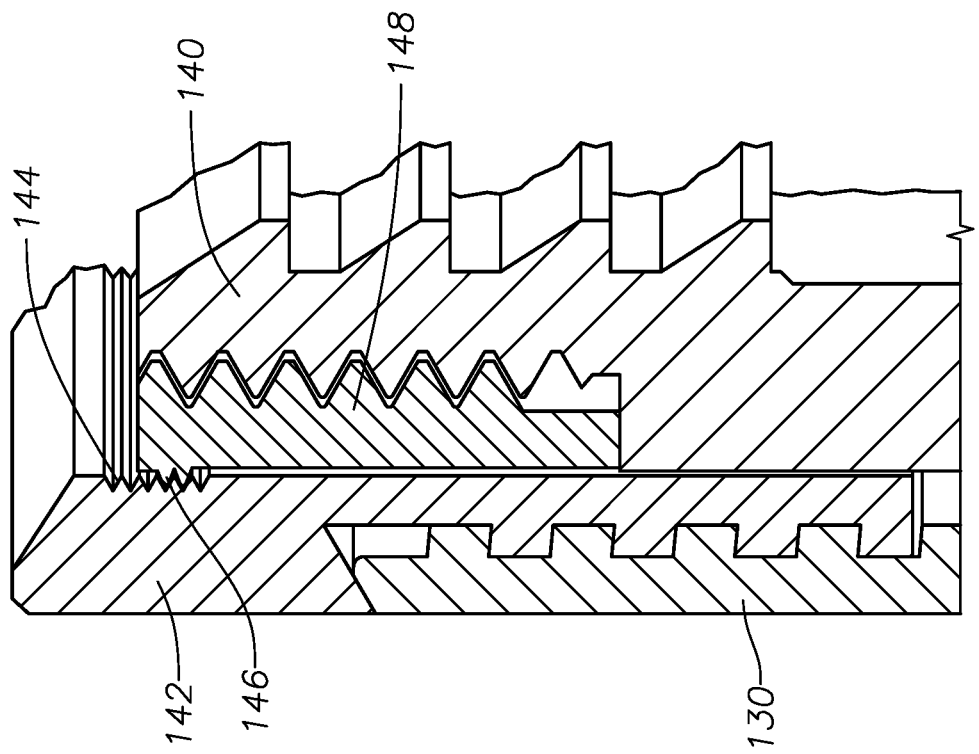
FIG. 3 is an enlarged view of a portion of an annular sealing assembly with an energizing ring having the retaining feature of FIG. 1 shown with the retaining feature engaged with a minimum stroke.
Figure 4:
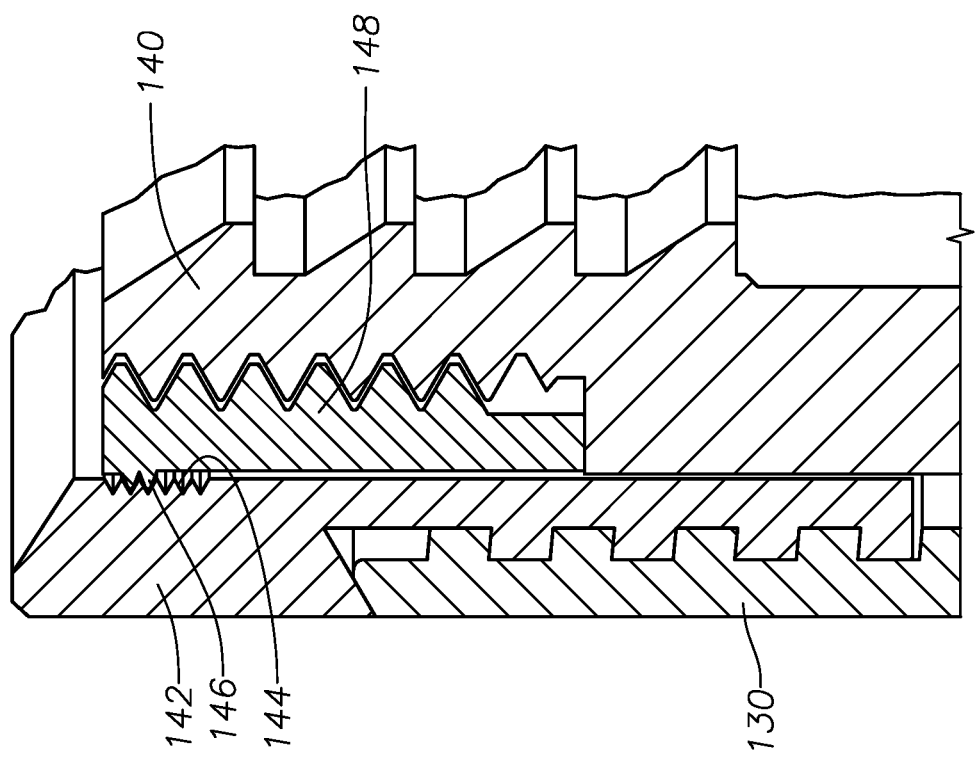
FIG. 4 is an enlarged view of a portion of an annular sealing assembly with an energizing ring having the retaining feature of FIG. 1 shown with the retaining feature engaged with a maximum stroke.

Looking at FIGS. 3-4, in order to allow a measure of flexibility in the final relative axial location between energizing ring 140 and annular seal 128, the number of mating grooves 144 is greater than the number of mating protrusions 146. Each of the mating protrusions 146 will engage one of the mating grooves 144 when energizing ring 140 is in an energized position and mating protrusions 146 can mate with any range of mating grooves 144. Looking at FIG. 3, as an example, with a minimum stroke of energizing ring 140 inserted into annular seal 128, mating protrusions 146 engage an upper range of mating grooves 144. Looking at FIG. 4, as an example, with a maximum stroke of energizing ring 140 inserted into annular seal 128, mating protrusions 146 engage a lower range of mating grooves 144.

In certain embodiments, mating protrusions 146 are helical male threads and mating grooves 144 are corresponding female helical threads. In such an embodiment, mating protrusions 146 can threadingly engage mating grooves 144 to mate mating protrusions 146 with the mating grooves 144. In alternate embodiments, mating protrusions 146 are axially spaced protruding circumferential bands and mating grooves 144 are axially spaced circumferential recesses. In such an embodiment, mating protrusions 146 ratchet over mating grooves 144 to engage and mate mating protrusions 146 with mating grooves 144.

In other alternate embodiments, mating protrusions 146 can be located on retainer nut 142 and mating grooves 144 can be located on energizing ring 140. In such an embodiment, mating protrusions 146 can be helical male threads or axially spaced protruding circumferential bands and mating grooves 144 can be helical female threads or axially spaced protruding circumferential bands, as applicable.

Mating protrusions 146 can circumscribe the entire 360 degree circumference of energizing ring 140. Looking at FIG. 2, top ring 148 can be releasably secured to energizing ring 140, and mating protrusions 146 can be located on top ring 148. As an example, top ring 148 can be threaded onto an outer diameter of energizing ring 140. In certain embodiments, top ring 148 can be a ring shaped member and in alternate embodiments, top ring 148 can be a C-ring or other shape. In such alternate embodiments, mating protrusions 146 may circumscribe less than an entire 360 degree circumference of energizing ring 140 because of the slot in the C-ring. In alternate embodiments, mating protrusions 146 can be formed directly on the outer diameter of energizing ring 140.

Mating protrusions 146 and mating grooves 144 can be designed so that there is minimal additional setting force required to engage and mate mating protrusions 146 with mating grooves 144 than there would be if mating protrusions 146 and mating grooves 144 were not included. However, mating protrusions 146 and mating grooves 144 will be capable of creating a load path between energizing ring 140 and retainer nut 142 so that upward forces on inner wellhead member 104 that results in an axial force on energizing ring 140 relative to retainer nut 142 can be transferred through mating protrusions 146 to mating grooves 144.

Referring to FIGS. 1-4, in an example of operation, after inner wellhead member 104 has been landed within outer wellhead member 102, energizing ring 140 can be moved axially into slot 134 to push outer leg 130 radially outward such that outer sealing surface 136 engages housing sealing surface 120. In the example of FIG. 1, outer leg 130 imbeds into wickers "W" and inner leg 132 is urged radially inward such that inner sealing surface 138 engages hanger sealing surface 122 to provide both a sealing capacity and lockdown capacity.

As energizing ring 140 is moved into slot 134, mating protrusions 146 engage and mate with mating grooves 144 to prevent relative axial movement between energizing ring 140 and annular seal 128 so that the sealing capacity and lockdown capacity of sealing assembly 124 is maintained. Mating protrusions 146 can be threaded with mating grooves 144 or can ratchet axially past mating grooves 144. The setting load required to engage and mate mating protrusions 146 with mating grooves 144 is well below the capacity of current setting tools. During any retrieval of sealing assembly 124, a retrieval tool can either unthread mating protrusions 146 from mating grooves 144 or apply a sufficient upward axial force on energizing ring 140, such as one that is above any axial operating load on energizing ring 40, to disengage mating protrusions 146 from mating grooves 144.

Systems and method described herein therefor provide for increased sealing capability, increased the lockdown capacity, and increased fatigue life of sealing assembly 124 compared to some current designs.

The systems and methods described herein, therefore, are well adapted to carry out the objects and attain the ends and advantages mentioned, as well as others inherent therein. While example embodiments of the disclosure have been given for purposes of disclosure, numerous changes exist in the details of procedures for accomplishing the desired results. These and other similar modifications will readily suggest themselves to those skilled in the art, and are intended to be encompassed within the disclosure and the scope of the appended claims.

What is claimed is:

1. A sealing assembly for use in a wellbore, comprising:
   an annular seal having inner and outer legs separated by a slot, the inner and outer legs joined at a bottom of the slot; and
   an energizing ring that engages the inner and outer legs within the slot, the energizing ring driving at least a portion of the inner leg in a radially opposite direction than at least a portion of the outer leg, the outer leg adapted to engage a retainer nut, the retainer nut configured to couple to the energizing ring, via protrusions that mate with grooves formed on the energizing ring, when the energizing ring is an energized energizing position to block relative axial movement between the energizing ring and the annular seal, wherein the grooves are arranged at an outer diameter of the energizing ring and the protrusions are arranged at an inner diameter of the retainer nut.

2. The sealing assembly of claim 1, wherein a number of grooves is greater than a number of protrusions, the protrusions operable to mate with any range of the grooves.

3. The sealing assembly of claim 1, wherein a number of protrusions is greater than a number of grooves, the grooves operable to mate with any range of the protrusions.

4. The sealing assembly of claim 1, wherein the energizing ring is annular.

5. The sealing assembly of claim 1, further comprising a top ring secured to the energizing ring, the top ring arranged between the retainer nut and an inner diameter of the energizing ring.

6. The sealing assembly of claim 1, wherein the retainer nut is positioned axially higher than the energizing ring when the energizing ring is secured to the retainer nut and positioned within the slot.

7. A wellbore sealing assembly, comprising:
   an annular seal having an inner leg and an outer leg, the inner and outer legs separated by a slot so that a free end of each of the inner and outer legs is spaced apart and a joined end of each of the inner and outer legs is connected together;
   an energizing ring with surfaces that slidingly engage the inner and outer legs of the annular seal, selectively moving the annular seal to an energized position by pushing the inner leg into sealing engagement with a hanger sealing surface and the outer leg into sealing engagement with a housing sealing surface;
   a retainer nut threadingly attached to the free end of the outer leg of the sealing assembly, the retainer nut retaining the energizing ring with the annular seal during insertion of the sealing assembly into an annular pocket between a wellhead housing and a casing hanger;
   mating grooves formed on an inner diameter of the retainer nut; and
   mating protrusions located on an outer diameter of the energizing ring, the mating protrusions shaped to engage and mate with the mating grooves when the annular seal is in the energized position, preventing relative axial movement between the energizing ring and the annular seal.

8. The wellbore sealing assembly of claim 7, wherein the mating protrusions are circumferential bands.

9. The wellbore sealing assembly of claim 7, wherein a number of mating grooves is greater than a number of mating protrusions, each of the mating protrusions engaging one of the mating grooves when the annular seal is in the energized position.

10. The wellbore sealing assembly of claim 7, further comprising a top ring releasably secured to the energizing ring, and wherein the mating protrusions are located on the top ring.

11. The wellbore sealing assembly of claim 10, wherein the mating protrusions extend around a circumference of the top ring.

12. The wellbore sealing assembly of claim 7, wherein the mating protrusions are axially spaced circumferential bands and the mating protrusions ratchet over the mating grooves to mate the mating protrusions with the mating grooves.

13. The wellbore sealing assembly of claim 7, wherein the mating protrusions circumscribe a circumference of the energizing ring.

14. The wellbore sealing assembly of claim 7, wherein the retainer nut is positioned axially higher than the energizing ring when the energizing ring is secured to the retainer nut and positioned within the slot.

15. A wellbore sealing assembly, comprising:
   an annular seal having an inner leg and an outer leg, the inner and outer legs separated by a slot so that a free end of each of the inner and outer legs is spaced apart and a joined end of each of the inner and outer legs is connected together;

an energizing ring that extends into the slot;

a retainer nut threadingly attached to the free end of the outer leg of the sealing assembly and to the energizing ring;

mating grooves formed on an inner diameter of the retainer nut; and mating protrusions located on an outer diameter of the energizing ring, the mating protrusions shaped to engage and mate with the mating grooves when the annular seal is in an energized position, preventing relative axial movement between the energizing ring and the annular seal.

16. The wellbore sealing assembly of claim 15, wherein the mating protrusions are circumferential bands.

17. The wellbore sealing assembly of claim 15, wherein a number of mating grooves is greater than a number of mating protrusions, each of the mating protrusions engaging one of the mating grooves when the annular seal is in the energized position.

18. The wellbore sealing assembly of claim 15, further comprising a top ring releasably secured to the energizing ring, and wherein the mating protrusions are located on the top ring.

19. The wellbore sealing assembly of claim 18, wherein the mating protrusions extend around a circumference of the top ring.

* * * * *